(12) United States Patent
Lincoln et al.

(10) Patent No.: US 9,768,989 B2
(45) Date of Patent: Sep. 19, 2017

(54) METHOD AND APPARATUS FOR SOFT SYMBOL GENERATION IN A COMMUNICATION RECEIVER

(71) Applicant: Telefonaktiebolaget L M Ericsson (publ), Stockholm (SE)

(72) Inventors: Bo Lincoln, Lund (SE); Fredrik Nordström, Lund (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 636 days.

(21) Appl. No.: 13/888,976

(22) Filed: May 7, 2013

(65) Prior Publication Data

US 2014/0334579 A1 Nov. 13, 2014

(51) Int. Cl.
*H04L 27/06* (2006.01)
*H04L 25/06* (2006.01)
*H04L 27/38* (2006.01)

(52) U.S. Cl.
CPC ........... *H04L 25/067* (2013.01); *H04L 27/38* (2013.01)

(58) Field of Classification Search
USPC ........................................................ 375/341
See application file for complete search history.

(56) References Cited

U.S. PATENT DOCUMENTS

| | | | |
|---|---|---|---|
| 5,825,832 A * | 10/1998 | Benedetto | ............... 375/341 |
| 7,315,578 B2 | 1/2008 | Cheng | |
| 7,397,843 B2 | 7/2008 | Grant et al. | |
| 8,340,202 B2 | 12/2012 | Huss et al. | |
| 2005/0141628 A1 | 6/2005 | Cheng | |
| 2010/0098194 A1 | 4/2010 | Reial | |
| 2011/0222618 A1 | 9/2011 | Huss et al. | |
| 2012/0219097 A1* | 8/2012 | McCloud et al. | ............ 375/341 |

FOREIGN PATENT DOCUMENTS

| | | |
|---|---|---|
| EP | 2426842 A1 | 3/2012 |
| WO | 2010043556 A1 | 4/2010 |

OTHER PUBLICATIONS

Bottomley, G. et al. "Advanced Receivers for WCDMA Terminal Platforms and Base Stations." Ericsson Review No. 2, 2006. Available online at: http://www.ericsson.com/res/thecompany/docs/publications/ericsson_review/2006/g_rake.pdf.

* cited by examiner

*Primary Examiner* — Nader Bolourchi
(74) *Attorney, Agent, or Firm* — Murphy, Bilak & Homiller, PLLC

(57) ABSTRACT

A simplified but accurate soft-symbol determination process represents one of the advantages provided by the example embodiments disclosed herein. In this regard, a mapping function "maps" symbol estimates to corresponding soft symbol values, which may be used in interference mitigation, joint detection processing, etc. Whether the mapping function is implemented on-the-fly as a live calculation or is embodied in a look-up table, it advantageously operates on the symbol estimates directly, rather than requiring the derivation of corresponding soft bit values or the like, and it maps each symbol estimate to its "expected value," i.e., the weighted sum of constellation point probabilities. Moreover, the mapping function may be changed dynamically—e.g., by using different look-up tables—to account for changing reception conditions and/or different modulation schemes or other signal parameters associated with the symbols being estimated and mapped to soft symbol values.

27 Claims, 10 Drawing Sheets

METHOD AND APPARATUS FOR SOFT SYMBOL GENERATION IN A COMMUNICATION RECEIVER

TECHNICAL FIELD

The present invention generally relates to communication signal processing, and particularly relates to soft symbol generation in the context of processing a received communication signal.

BACKGROUND

An interference cancellation (IC) receiver improves reception performance by reconstructing or estimating one or more interfering signal components within a received signal, for use in suppressing the interfering component(s) with respect to one or more desired signal components within the received signal. The terms "interfering" and "desired" may be regarded as working labels because IC processing can be performed for a desired signal component with respect to one or more other signal components, desired or otherwise. Various IC receiver architectures are known.

One class or type of IC receiver uses post-decoding IC. Such receivers obtain a regenerated signal corresponding to a given interferer according to a signal regeneration process that commonly includes four steps: symbol estimate generation (e.g. by using equalization and/or Interference Rejection Combining or IRC); soft value extraction (e.g. using the "log-max" method or other soft-bit processing); decoding for soft value improvement (e.g. using a soft-output Turbo decoder); and soft value-to-soft symbol mapping, where such mapping is driven by decoded bits or related soft bit information.

The decoding step may be omitted in some scenarios and architectures, yielding a structure that may be referred to as a "pre-decoding" IC architecture. In such receivers, the initial soft bit values obtained for, e.g., interfering symbols, are immediately used for soft symbol mapping.

However, while relatively efficient approaches are known for the generation of soft symbol values from soft bit information, the complexity of these approaches is still far from negligible, especially for Higher Order Modulation (HOM). For example, for 64QAM, six soft values have to be generated per received symbol and a corresponding six terms added to form the soft symbol estimate, including related absolute value, addition, function lookup, and scaling operations. Furthermore, simplifications of the soft value extraction process that incorporate an implicit log-max approximation may suffer from poor performance at the low symbol SNR levels that are typical for other-cell interference signals within wireless communication networks, such as UTRAN and E-UTRAN based cellular communication networks.

SUMMARY

A simplified but accurate soft-symbol determination process represents one of the advantages provided by the example embodiments disclosed herein. A mapping function "maps" symbol estimates to corresponding soft symbol values, which may be used in interference mitigation, joint detection processing, etc. Whether the mapping function is implemented on-the-fly as a live calculation or is embodied in a look-up table, it advantageously operates on the symbol estimates directly, rather than requiring the derivation of corresponding soft bit values or the like, and it maps each symbol estimate to its "expected value," i.e., the weighted sum of constellation point probabilities. Moreover, the mapping function may be changed dynamically—e.g., by using different look-up tables—to account for changing reception conditions and/or different modulation schemes or other signal parameters associated with the symbols being estimated and mapped to soft symbol values.

In one example, a wireless apparatus performs a method of symbol estimation that includes receiving a communication signal that includes first and second signal components, and further includes generating first symbol estimates corresponding to first symbols conveyed in the first signal component. Each first symbol estimate represents a symbol component and an error component and the method further includes obtaining soft symbol values from the first symbol estimates via a mapping function that maps each first symbol estimate to a corresponding soft symbol value.

Advantageously, the soft symbol value represents a probability-weighted summation of all constellation points in a defined modulation constellation assumed for the first symbols. Here, the probability weighting of each constellation point in the summation is a function of the first symbol estimate relative to the constellation point and an assumed error distribution for the error components of the first symbol estimates. The mapping therefore obtains the "expected value" of each first symbol estimate and advantageously does so by operating directly on the first symbol estimate, which is, e.g., a complex value corresponding to the as-received phase and magnitude of the associated first symbol.

The method further includes estimating second symbols as a function of the soft symbol values. Here, the second symbols are conveyed in the second signal component of the communication signal. In one example, estimating the second symbols as a function of the soft symbol values comprises using the soft symbol values to mitigate interference in the second symbols arising from the first symbols. In the same or another example, estimating the second symbols as a function of the soft symbol values comprises using the soft symbol values to generate joint detection metrics for detecting the second symbols, e.g., in a joint detection (JD) process that jointly detects the first and second symbols.

In another example, a wireless apparatus includes receiver circuitry configured to output a communication signal corresponding to an antenna-received communication signal and having first and second signal components. Correspondingly, the wireless apparatus includes a processing circuit that is operatively associated with the receiver circuitry. The processing circuit is configured to process the communication signal, e.g., according to the above-described method. It will be appreciated that the processing circuit may be implemented at least in part based on the programmatic configuration of the processing circuit. That is, in at least one embodiment, the processing circuit comprises one or more microprocessor-based circuits, DSP-based circuits, or other such digital processing circuitry that is configured according to its execution of computer program instructions stored in a memory or other computer-readable medium that is accessible to the digital processing circuitry.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
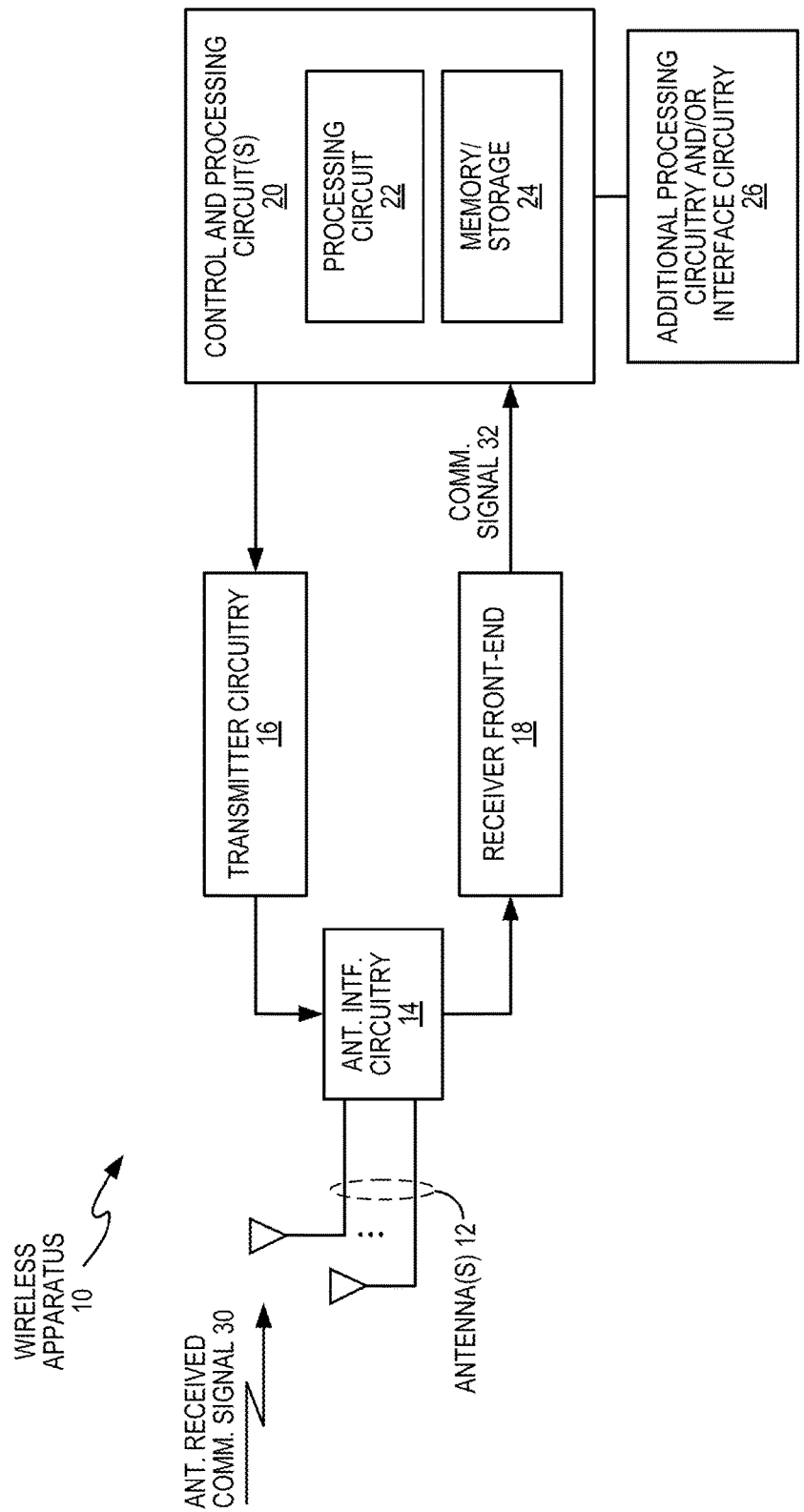
FIG. 1 is a block diagram of one embodiment of a wireless apparatus.

FIG. 1 illustrates a wireless apparatus 10. By way of non-limiting example, the wireless apparatus 10 comprises a Third Generation Partnership Project (3GPP) User Equipment (UE) or other type of mobile terminal or station. More broadly, the wireless apparatus 10 comprises essentially any type of cellular radiotelephone, modem or other network adaptor, wireless laptop computer, or other such wireless transceiver that is configured to receive one or more types of communication signals.

In the illustrated example, the wireless apparatus 10 includes one or more antennas 12, antenna interface circuitry 14, transmitter circuitry 16, receiver circuitry 18, and control and processing circuits 20, which include a processing circuit 22 and memory/storage 24. The wireless apparatus 10 may further include additional processing circuitry and/or interface circuitry 26, depending on its intended use and features. Along those lines, those skilled in the art will appreciate that the wireless apparatus 10 may have different or additional circuitry than that illustrated, and that a variety of processing-circuit implementations other than those illustrated may be configured or otherwise adapted to carry out the processing taught herein.

Figure 2:
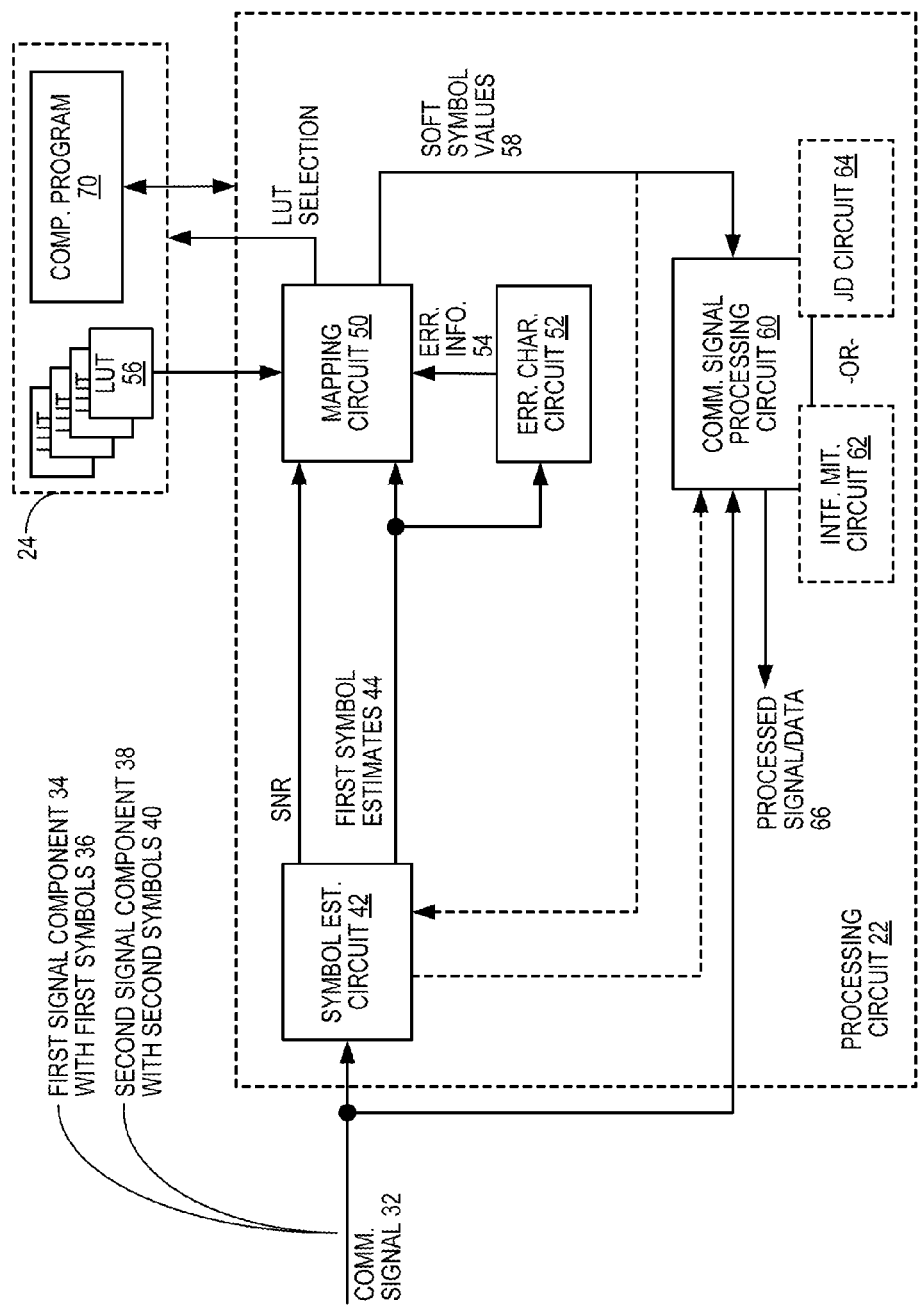
FIG. 2 is a block diagram of example circuits realized within a processing circuit of the wireless apparatus introduced in FIG. 1.

As shown by way of example in FIG. 2, the processing circuit 22, which may comprise one or more microprocessors or other digital processing circuits, includes a number of functional and/or physical circuits, which also may be referred to "units" or "processing units." Before describing example processing units, consider the communication signal 32. This signal is, for example, a "composite" signal having desired and interfering signal components—it may have one desired signal component and one or multiple interfering signal components in it, or it may have multiple desired signal components that are received concurrently and interfere with each other.

In the illustrated example, the communication signal 32 includes a first signal component 34 conveying first symbols 36 and a second signal component 38 conveying second symbols 40. The first signal component 34 may be an other-cell signal from a neighboring cell in a wireless communication network, while the second signal component 38 may represent an own-cell/serving-cell signal that is interfered with by the first signal component 34. That is, the second signal component 38 conveys a stream of (desired) second symbols 40 to the wireless apparatus 10, while the first signal component 34 conveys a stream of (interfering) first symbols 36, which are concurrently received at the wireless apparatus 10 with the second symbols 40. In this regard, mitigating interference in the second symbols 40 arising from the first symbols 36 yields performance improvements.

Of course, it may be that the symbols 36 and the symbols 40 are desired in some sense, so interference mitigation may be performed for the second symbols 40 with respect to the first symbols 36, and vice versa, for the first symbols 36 with respect to the second symbols 40. As will be discussed more fully, such processing may be based on joint detection. In any case, it will be understood that "first" and "second" are merely labels for conveniently distinguishing between different, concurrently received symbol streams that interfere with respect to one another.

Turning back to the processing unit examples in FIG. 2, the processing circuit 22 includes a symbol estimation circuit 42 that generates first symbol estimates 44, a mapping circuit 50 and an error characterization circuit 52 that generates error information 54 for the mapping circuit 50. In turn, the mapping circuit 50, which may use one or more Look-up Tables (LUTs) 56, maps the first symbol estimates 44 to corresponding soft symbol values 58.

In an example case, the first symbol estimates 44 are estimates of the first symbols 36. Here, a symbol estimate should be understood as a complex value, e.g., representing a phase value and a magnitude value. In general, because of channel distortions, noise and interference, a symbol estimate will not perfectly align to any defined constellation point within the applicable modulation constellation, where each such constellation point is defined, e.g., by a unique combination of nominal phase and magnitude values. Thus, each first symbol estimate 44 may be regarded as representing a symbol component and an error component. However, the teachings herein nonetheless provide for an accurate and computationally simplified process of mapping the first symbol estimates directly to corresponding soft symbol values 58.

The mapping may be done using on-the-fly computations or may be done using one or more LUTs 56 that embody the mapping function but offer the advantage of using pre-computed soft symbol values. In either case, the mapping may be changed or otherwise adapted dynamically, e.g., as a function of the symbol Signal-to-Noise Ratio (SNR) of the first symbols 36 and/or as a function of the error information 54 provided by the error characterization circuit 52, which may comprise one or more statistical properties of the error components of the first symbol estimates 44, such as an estimated error distribution. Thus, different mappings may be used for different SNR ranges and/or for different types of interference (different error distributions associated with the error components of the first symbol estimates 44).

The soft symbol values 58 are fed to a communication signal processing circuit 60, which generally also receives the overall communication signal 32 and uses the soft symbol values 58 in processing the communication signal 32, e.g., in an interference mitigation circuit 62 or in a Joint Detection (JD) circuit 64, to obtain processed signals/data 66. In an example case, the communication signal processing circuit 60 uses the soft symbol values 58 to estimate the contributions in the communication signal 32 made by the first symbols 36, and subtracts those contributions from the communication signal 32, to mitigate interference arising from them in the second symbols 40, to improve demodulation and/or decoding of the second symbols 40, for obtaining the processed signals/data 66.

In the example immediately above, it will be appreciated that the communication signal processing circuit 60 performs symbol demodulation and decoding with respect to the second symbols 40, and uses the soft symbol values 58 corresponding to the (interfering) first symbols 36 to improve such processing. The communication signal processing circuit 60 therefore may include all or part of the symbol estimation circuit 42, or reuse some of its functional circuitry to obtain second symbol estimates (not explicitly shown) corresponding to the second symbols 40.

Viewed from a different perspective, the symbol estimation circuit 42 generates the second symbol estimates for the second symbols 40, in addition to generating the first symbol estimates 44 for the first symbols 36, and it may therefore use the soft symbol values 58 to perform interference mitigation for the second symbols 40 with respect to the first symbols 36, and the communication signal processing circuit 60 could then receive the second symbol estimates directly from the symbol estimation circuit 42. This alternative view is suggested by the dashed-line connections between the mapping circuit 50 and the first symbol estimation circuit 42 and between communication signal processing circuit 60 and the symbol estimation circuit 42 in FIG. 2.

Figure 3:
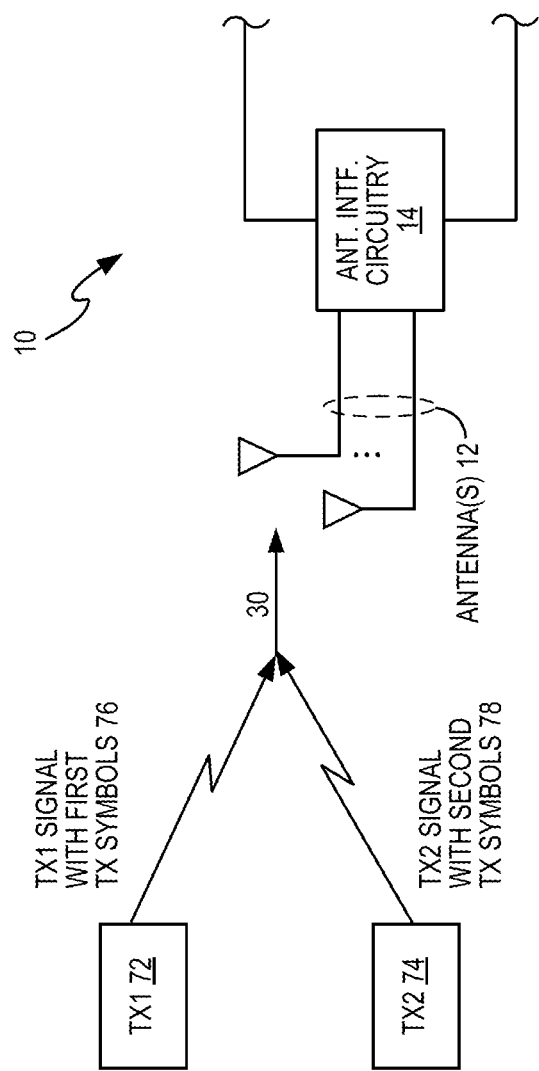
FIG. 3 is a block diagram of a portion of the wireless apparatus of FIG. 1 and illustrates an example signal reception scenario.

FIG. 3 illustrates an example case where the antenna-received communication signal 30 is the composite of transmissions from a first transmitter 72 and a second transmitter 74, which transmitters may be base stations or other radio network nodes in a wireless communication network. The first transmitter 72 transmits a "TX1" signal that includes first transmitted symbols 76, which can be understood as the first symbols 36 but viewed from the transmit side. Likewise, the second transmitter 74 transmits a "TX2" signal that includes second transmitted symbols 78, which can be understood as the second symbols 40 but viewed from the transmit side. In other words, the TX symbols 76 can be understood as the nominal symbol values corresponding to the distorted versions received at the wireless apparatus 10 as the first symbols 36—i.e., the transmitted values of the first symbols 36. Thus, the symbol component in each first symbol estimate 44 corresponds to the nominal, as-transmitted symbol value, while the error component accounts for noise and interference.

Figure 4:
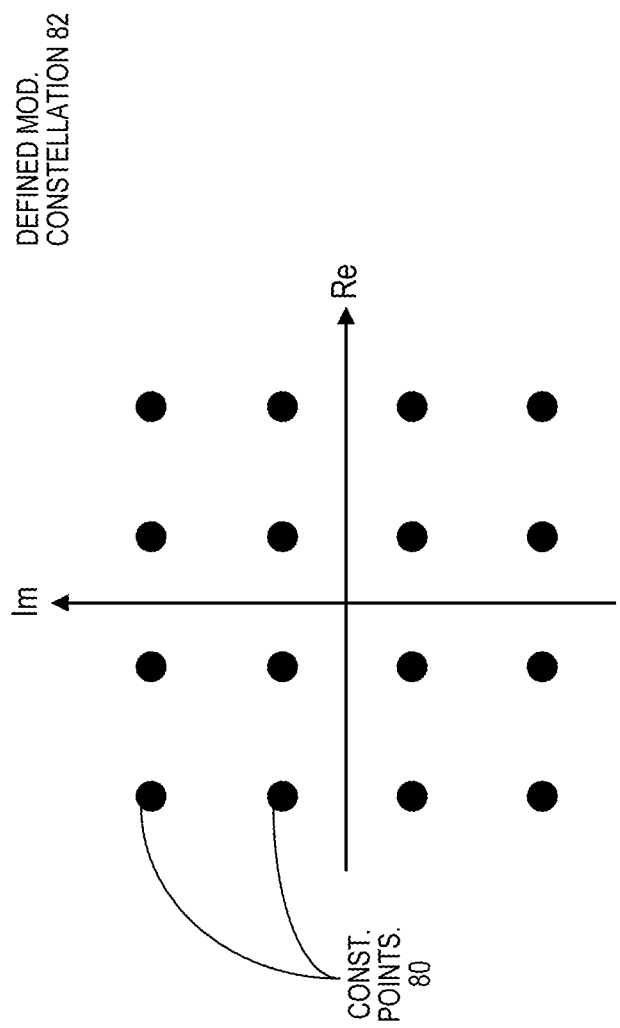
FIG. 4 is a diagram of an example defined modulation constellation, including a number of constellation points at given phase and magnitude positions within the constellation.

Consider FIG. 4 in the same context. The diagram illustrates constellation points 80 within a defined modulation constellation 82. The TX symbols 76 represent different ones of the nominal constellation points 80, with each such point being defined by a unique pairing of phase and magnitude. As is well understood in the art, the first symbol estimates 44, even after appropriate scaling or normalization, generally will not align with any of the defined constellation points 80, but rather will fall into the regions between them.

With the above example information in mind, and with reference again to FIGS. 1, 2 and 4, the wireless apparatus 10 in one embodiment comprises receiver circuitry 18 configured to output a communication signal 32 corresponding to an antenna-received communication signal 30 and comprising first and second signal components 34, 38. The wireless apparatus 10 further includes a processing circuit 22 that is operatively associated with the receiver circuitry 18 and configured to generate first symbol estimates 44 corresponding to first symbols 36 conveyed in the first signal component 34, each first symbol estimate 44 representing a symbol component and an error component.

The processing circuit 22 is further configured to obtain soft symbol values from the first symbol estimates 44 via a mapping function that maps each first symbol estimate 44 to a corresponding soft symbol value 58 that represents a probability-weighted summation of all constellation points 80 in a defined modulation constellation 82 assumed for the first symbols 36. The probability weighting of each constellation point 80 in the summation is a function of the first symbol estimate 44 relative to the constellation point 80 and an assumed error distribution for the error components of the first symbol estimates 44.

The processing circuit 22 is further configured to estimate second symbols 40 as a function of the soft symbol values 58, where the second symbols 40 are conveyed in the second signal component 38 of the communication signal 32. In this regard, each second symbol 40 may be overlapped at least partially in time by one or more of the first symbols 36 and the corresponding soft symbol values 58 generated for the (overlapping) first symbols 36, and therefore can be used to mitigate their interference with respect to the second symbol 40.

Thus, in one or more embodiments, the processing circuit 22 is configured to estimate the second symbols 40 as a function of the soft symbol values 58, by using the soft symbol values 58 to mitigate interference in the second symbols 40a rising from the first symbols 36. The processing circuit 22 is, for example, configured to estimate, as a function of the soft symbol values 58, contributions of the first symbols 36 to the communication signal 32, and to subtract the estimated contributions from corresponding samples of the communication signal 32 before or in conjunction with demodulating or decoding the communication signal 32 with respect to the second symbols 40.

The processing circuit 22 also may be configured to estimate the second symbols 40 as a function of the soft symbol values 58 by using the soft symbol values 58 to generate joint detection metrics for detecting the second symbols 40. This approach is suggested in FIG. 2, via the optional inclusion of the JD circuit 64 within the communication signal processing circuit 60. In some embodiments, the soft symbol values 58 are used to remove the impact of undesired, interference components due to the "first" symbols being present in the received signal, to improve the JD quality. To that end, the joint decision metric is modified by subtracting one or more interference terms corresponding to the "first" symbols that are not included in the JD hypothesis search space. The interference terms are based on the soft symbol values 58 and may include the impact of the effective propagation channel, interaction with other signal components, etc. Joint detection processing and metric generation is well understood in the art and is therefore not further elaborated here, as the focus is on a computationally efficient but accurate process for obtaining soft symbol values 58 for any given "first" symbols that are interfering symbols in some sense with respect to given "second" symbols.

In some embodiments and with respect to a given first symbol 36, that process includes determining probability weightings for each constellation point 80 as a probability value indicating the probability that the constellation point 80 represents the transmitted value of the corresponding first symbol 36. As a further advantage contemplated herein, the mapping function implemented via the processing circuit 22 incorporates one or more "regularization" terms that are computed as a function of a SNR estimated for the first symbol estimates 44—i.e., the symbol SNR of the first symbols 36. The regularization terms are operative to reduce probability-weighting errors arising from differences between the assumed error distribution and the actual error distribution of the error components of the first symbols 36.

A regularization term in this regard can be understood as controlling or regulating the mapping operation, by imposing limits on one or more computed values. In at least one embodiment, the one or more regularization terms comprise one or more terms that are operative within the mapping function to: limit the minimum and/or maximum probability value used for probability weighting; limit the minimum assumed variance of the error components of the first symbol estimates 44; limit a maximum allowable distance between each first symbol estimate 44 and the constellation points 80 in the defined modulation constellation 82; and scale up an error variance estimate associated with the error components of the first symbol estimates 44.

Limiting the maximum and/or minimum probability values that are generated for a given first symbol estimate 44 with respect to a given constellation point can be understood as preventing excessive probability value errors, which can arise if the error distribution exhibited by the error components of the first symbol estimates 44 differs significantly from the assumed error distribution. The maximum and/or minimum permissible probability values can be made dependent on symbol SNR estimated for the first symbols 36, e.g., with tighter constraints imposed on the calculated probability values for a defined lower range of SNR.

The mapping function itself also may be changed or adapted. In at least one embodiment, the processing circuit 22 is configured to change the mapping function used to obtain the soft symbol values 58, based on at least one of: the modulation scheme estimated or assumed for the first symbols 36, and a symbol SNR estimated for the first symbols 36.

For example, as shown in FIG. 2 there may be more than one LUT 56, with each one representing a different mapping function. The different mapping functions may correspond to different assumed error distributions for the error components of the first symbol estimates 44 and/or to different ranges of symbol SNR for the first symbols 36. More broadly, in at least one embodiment, the processing circuit 22 includes or is associated with a memory 24 storing a LUT 56, where the processing circuit 22 is configured to index into the LUT 56 as a function of the first symbol estimates 44 and the LUT 56 implements the mapping function by mapping from the first symbol estimates 44 to corresponding pre-computed soft symbol values 58.

Whether computed on the fly or implemented via one or more LUTs 56, in an example embodiment, the mapping function assumes the error components of the first symbol estimates 44 to be one or more interfering signals with known modulations plus additive Gaussian noise. As noted, the error characterization circuit 52 may be configured to estimate the error distribution of the error components of the first symbol estimates 44, for use as the assumed error distribution at issue in the mapping function, which is implemented by the mapping circuit 50 for obtaining the soft symbol values 58.

Also, as earlier noted, the symbol estimation circuit 42 is configured to output the first symbol estimates 44. It may do so, for example, based on performing an equalization process on the digital samples of the communication signal 32. Equalization processing is realized, e.g., by implementing a "chip correlation," "Generalized RAKE" or Orthogonal Frequency Division Multiplex (OFDM) Minimum Mean Square Error (MMSE) receiver circuit, or other known equalization receiver circuit, via the symbol estimation circuit 42. In general, a number of equalization processes are known for obtaining the first symbol estimates 44. Those details are not germane to the advantageous mapping taught herein, for determining soft symbol values 58 from the soft symbol estimates 44.

The soft symbol values 58, as advantageously determined according to the teachings herein, may be used for a number of receiver improvements. One of the processing circuit 22 and the receiver circuitry 18 includes the earlier-noted interference-mitigation circuit 62, which in one or more embodiments is configured to estimate contributions of the first symbols 36 to the communication signal 32. The estimations are based on the soft symbol values 58, and the interference-mitigation circuit 62 mitigates interference caused by the first symbols 36 by suppressing their estimated contributions from the communication signal 32, e.g., for detecting or decoding the second symbols 40.

Figure 5:
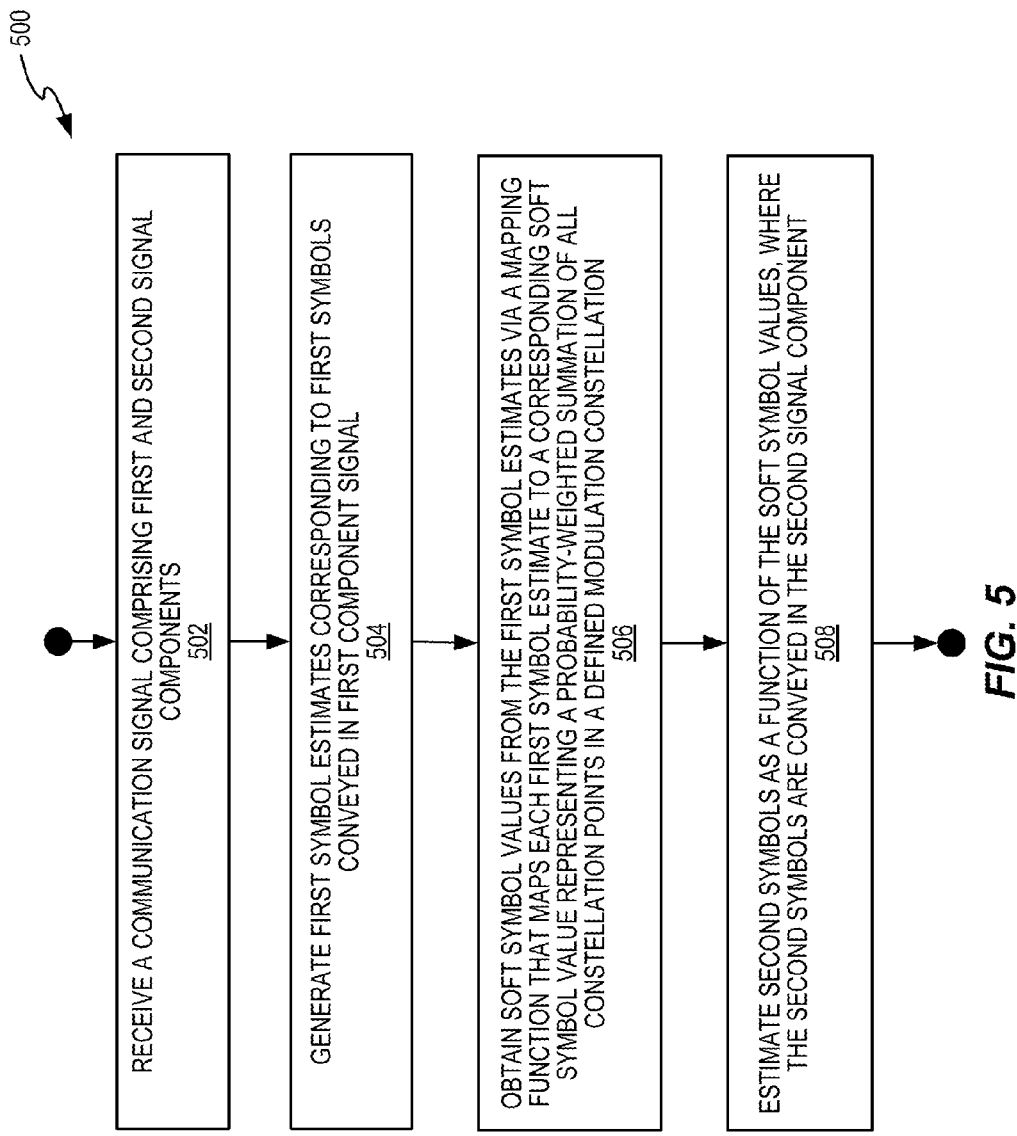
FIG. 5 is a logic flow diagram of one embodiment of a method of processing, such as may be performed in a wireless apparatus.

FIG. 5 provides an example of a processing method 500 that may be implemented via the processing circuit 22 of the wireless apparatus 10, for example. For example, FIG. 2 illustrates a computer program 70 that is stored in the memory/storage 24, which may comprise one or more memory devices and/or other types of storage, e.g., FLASH, EEPROM, disk, etc. In general, the computer program 70 may be stored in any computer readable medium that is in or accessible to the processing circuit 22 and it will be understood that in one or more embodiments the processing circuit 22 is programmatically configured at least in part to implement the method 500, based on its execution of the computer program instructions comprising the computer program 70.

Of course, other circuit arrangements may be used to implement the illustrated method 500 and its implementation is not limited to the example arrangements of processing circuits presented herein. Further, the method 500 is not necessarily limited to any order of processing that might be suggested by FIG. 5. One or more of the illustrated processing operations may be performed in a different order, or in parallel, and at least some of the processing operations may be integrated with or performed as part of a larger series of received-signal processing operations and the computer program 70 may include instructions for overall receiver processing operations, or may be part of a larger set of programming instructions.

With the above possibilities in mind, the processing of FIG. 5 "starts" with receiving a communication signal 30 that comprises first and second signal components 34 and 38 (Block 502). The first signal component 34 conveys first symbols 36 and the second signal component 38 conveys second symbols 40. The communication signal 30 may have many components and the illustrated processing may be performed or repeated for any number of interfering and desired signal components.

Further, the "receiving" may be understood in the sense that the wireless apparatus 10 receives the communication signal 30 via its one or more antennas 12—where multiple antennas 12 may be used for Multiple-Input-Multiple-Output or "MIMO" operation of the wireless apparatus 10. Alternatively, the "receiving" operation may be understood in the sense that the receiver circuitry 18 initially processes the antenna-received communication signal 30—e.g., by filtering, amplifying, down-converting and digitizing it—to obtain the corresponding communication signal 32, which is fed into ("received by") the processing circuit 22.

It will be appreciated that any particular block, subframe, frame or other portion of the communication signal 32 may be represented in the processing circuit 22 as a set or sets of buffered digital samples, which may be operated on once or multiple times—e.g., the same buffered set of communication signal samples may be used to obtain the first symbol estimates 44 corresponding to the first symbols 36 and used again to obtain second symbol estimates corresponding to the second symbols 40. In one example, such buffered samples are used to obtain the first symbol estimates 44 and those samples are then processed to remove the estimated contributions of the first symbols 36, i.e., using the soft symbol values 58 determined from the first symbol estimates 44, in the context of obtaining the second symbol estimates.

Of course, the above details are non-limiting examples and the method 500 broadly includes generating first symbol estimates 44 corresponding to the first symbols 36 (Block 504), each first symbol estimate 44 representing a symbol component and an error component, and further includes obtaining soft symbol values 58 from the first symbol estimates 44 via a mapping function (Block 506). The mapping function maps each first symbol estimate 44 to a corresponding soft symbol value 58 that represents a probability-weighted summation of all constellation points 80 in a defined modulation constellation 82 assumed for the first symbols 36. The probability weighting of each constellation point 80 in the summation is a function of the first symbol estimate 44 relative to the constellation point 80 and an assumed error distribution for the error components of the first symbol estimates 44. Here, something that is "assumed" may be understood as something that is actually known with certainty or something that is simply guessed as being true or otherwise taken for granted as being true.

The method 500 continues with estimating the second symbols 40 as a function of the soft symbol values 58, where, as has been noted, the second symbols 40 are conveyed in the second signal component 38 of the communication signal 32 (Block 508).

Further in that regard, the method 500 may include implementation of the mapping function via one or more LUTs 56, where a LUT 56 is indexed into as a function of the first symbol estimates 44 and maps the first symbol estimates 44 to corresponding pre-computed soft symbol values 58. There may be two or more LUTs 56, where each LUT 56 corresponds to a different assumed error distribution for the error components of the first symbol estimates 44, and the method 500 may include selecting which LUT 56 to use, based on which assumed error distribution is used. Broadly, the method 500 may include changing the mapping function used to obtain the soft symbol values 58, based on at least one of: the modulation scheme estimated or assumed for the first symbols 36, and a symbol SNR estimated for the first symbols 36.

Further, the method 500 may include applying the mapping function separately to the real and imaginary components of each first symbol estimate 44. Consider an example case where defined modulation constellation 82 is represented as one or more Pulse Amplitude Modulation (PAM) constellations having nominal magnitude values for the real and imaginary parts of the first symbols 36. Here, obtaining the soft symbol values 58 from the first symbol estimates 44 comprises, for each first symbol estimate 44, obtaining PAM symbol estimates corresponding to the real and imaginary parts of each first symbol estimate 44.

The method 500 may be based on the mapping function assuming the error components of the first symbol estimates 44 to be one or more interfering signals with known modulations plus additive Gaussian noise. In general, the error distribution may be assumed to be Gaussian or non-Gaussian, and the assumption may be changed, e.g., as a function of the error information 54 produced by the error characterization circuit 52. As a further example of dynamic adaptation, the method 500 may include scaling the first symbol estimates 44 as a function of received signal power—e.g., symbol SNR—as part of generating the first symbol estimates 44. That detail is among the example elaborations shown in FIG. 6 for Block 504 and 506 of the method 500.

Figure 6:
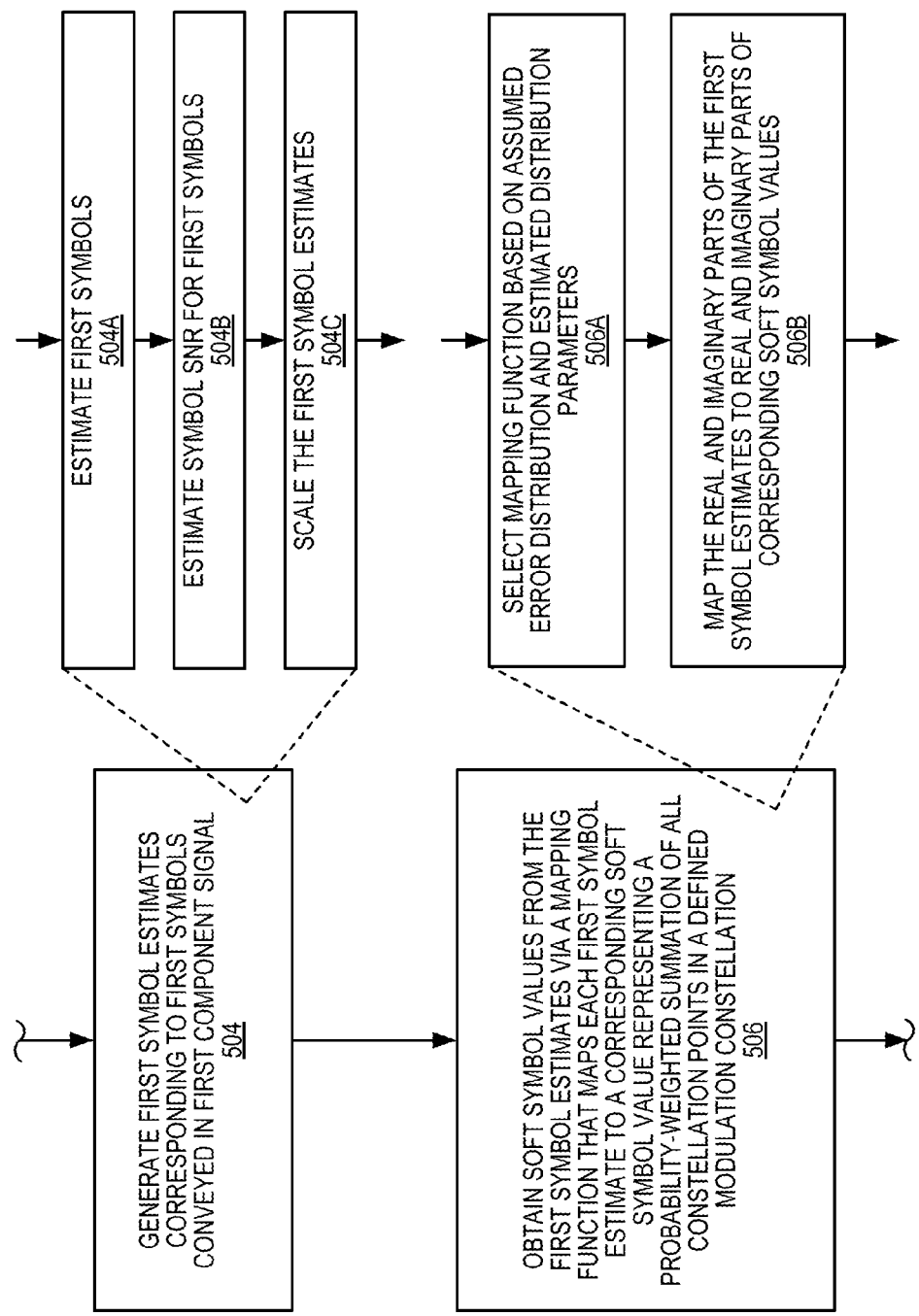
FIG. 6 is a logic flow diagram of partial example details for the processing method introduced in FIG. 5.

Turning to FIG. 6, one sees that Block 504 may comprise operations 504A, 504B and 504C, which includes estimating the first symbols 36 to obtain the first symbol estimates 44 (Block 504A), estimating the symbol SNR for the first symbols 36 (Block 504B), and scaling the first symbol estimates 44 as a function of the symbol SNR (Block 504C). Thus, generating the first symbol estimates 44 may be understood as including one or more scaling or normalization steps.

One also sees that Block 506 includes example detailed processing operations 506A and 506B. In the illustrated example, the step of obtaining soft symbol values 58 corresponding to the first symbol estimates 44 includes selecting the mapping function based on the assumed error distribution and estimated distribution parameters (Block 506A), and mapping the real and imaginary parts of the first symbol estimates 44 to real and imaginary parts of corresponding soft symbol values 58 (Block 506B). In this context, in one example, the error characterization circuit 52 can either output a SINR value—i.e., the total signal-to-interference-and-noise ratio—or a symbol constellation pattern including complex scaling and phase for each signal component outside of the first signal component, plus an SINR value for the remaining noise component which cannot be characterized by a symbol constellation pattern.

In one example, the SINR is determined based on reference symbols within the received symbol. Additionally, or alternatively, other signal constellation patterns may be known to the processing circuit 22 from higher-layer signaling or from eavesdropping on a control channel associated with an interfering data signal.

As for the mapping operations contemplated in the processing denoted as Block 506B, certain approaches may be available for certain types of modulation constellations. For example, in one embodiment involving QAM constellations, the complex mapping operation may be performed as two instances of real mapping operations, operating on the real and imaginary parts of the first symbol estimates 36.

Figure 7:
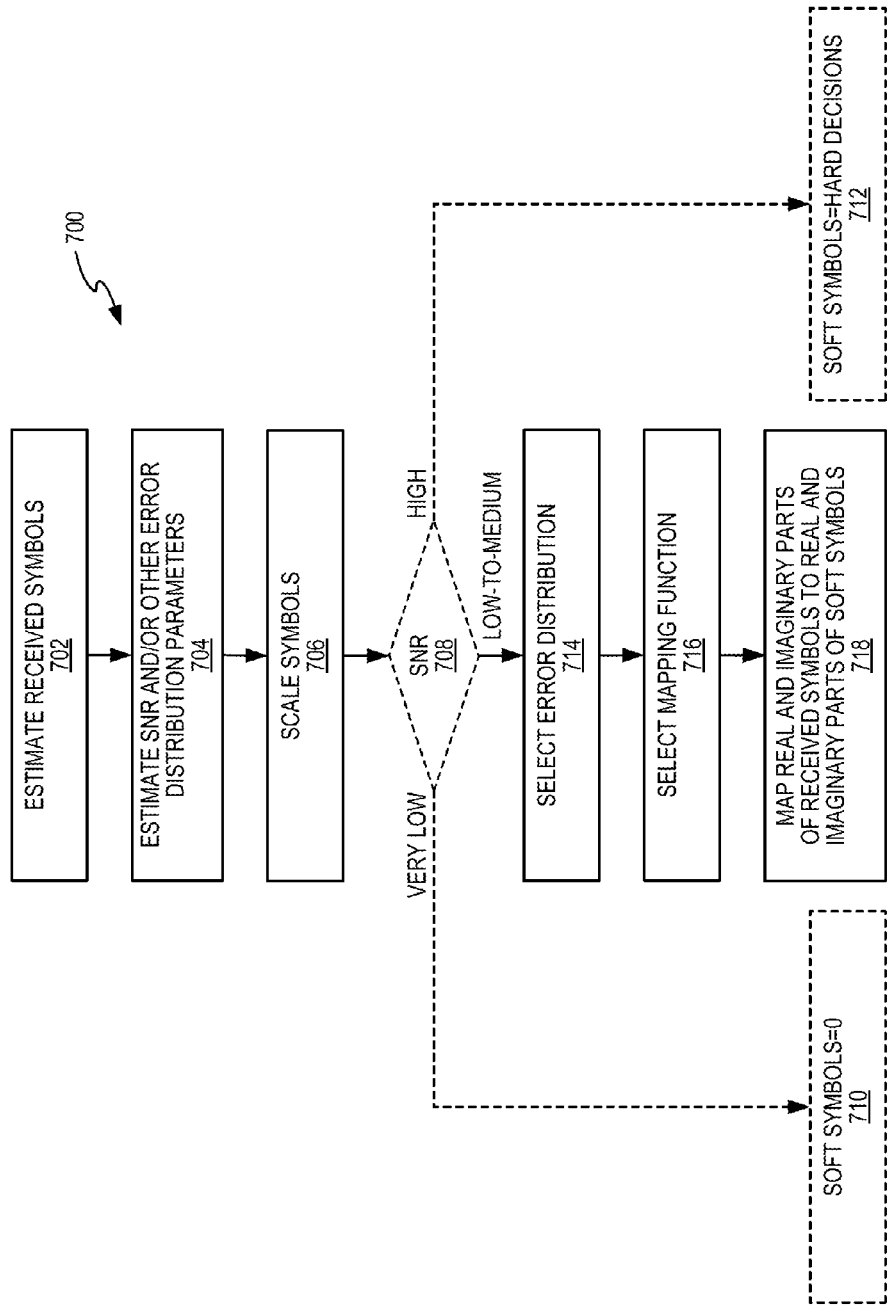
FIG. 7 is a logic flow diagram of another more detailed example or extension of the processing method introduced in FIG. 5.

FIG. 7 illustrates a method 700, which may be implemented in the wireless apparatus 10 via the processing circuit 22, or via other appropriately configured processing circuitry. The method 700 may be understood as a more detailed implementation of the method 500 as realized in one or more embodiments, or an extension thereof. Processing begins with estimating the received first symbols 36. For simplicity, the first symbols 36 may be referred to simply as "received symbols," and in the following discussion of FIG. 7, symbol-related references may be understood as references to the first symbols 36.

FIG. 7 assumes that the received symbols are QAM symbols. The processing circuit 22 estimates the received symbols (Block 702) to obtain received symbol estimates r, where r=s+n, where s is the transmitted symbol component and n is an error or noise component. The symbol SNR is estimated (Block 704), such as may be done using well known estimation techniques, and the receive symbol estimates are scaled (Block 706). Scaling may be considered part of symbol estimation and may be done so that $$E[|r|^2] = \frac{1}{SNR} + 1$$

corresponding to unit signal power. Here, E[x] represents the expected value of "x" and it should be noted that other approaches to scaling are contemplated and teachings herein are not limited to the example scaling.

The mapping function is denoted as $F^{(parameters)}$, where (parameters) can be understood as arguments for the mapping function F. The parameters (mod, SINR) may be considered as mandatory arguments, to denote that it is dependent on the current modulation (mod) scheme assumed for the received symbols and their Signal-to-Noise-and-Interference Ratio (SINR) or SNR. However, the mapping function F also may be configured to use additional arguments. For example, in cases that use a known or estimated constellation pattern of one or more interfering signals, the modulation and complex gain of these patterns are supplied as arguments to F.

Different LUTs 56 can be stored in the memory/storage 24, corresponding to different $F^{(parameters)}$. In support of such operations, Block 704 may include estimating one or more statistical properties for the error components of the estimated symbols, e.g., the error characterization circuit 52 of the processing circuit 22 estimating an error distribution parameter for the error components of the estimated symbols.

How the soft symbol values are determined from the estimated symbols may be conditioned on the symbol SNR. For example, if the symbol SNR is below a defined lower threshold ("VERY LOW" from Block 708), the soft symbol mapping may map the estimated symbols to zero ("0"), to reflect the small, possibly insignificant, interference contribution of them (Block 710). The upper threshold (e.g., measured in dB) defining this very low SNR range may be set in dependence on simulation and it may vary for different communication signal types, receiver designs, etc.

If the symbol SNR is above an upper threshold ("HIGH" from Block 708), it is considered to be in the high range and the soft symbol mapping may map the estimated symbols to corresponding "hard" symbol decisions (i.e., to their closest matching nominal constellation values) (Block 712). If the symbol SNR is between the low and high SNR ranges, e.g., the "low-to-medium" branch from Block 708, processing continues with Blocks 714, 716 and 718. As one example, the low range could be less than −10 dB, the low-to-medium range could be between −10 and 10 dB and the high range above 10 dB SINR.

It is further contemplated herein that in one or more embodiments this middle line of processing is pursued unconditionally, without regard to symbol SNR. The SNR decision Block 708 would be omitted, as would Blocks 710 and 712, and processing would proceed from Block 706 to Block 714 and then on from there.

Block 714 includes selecting the error distribution to assume for the error components of the symbol estimates that are being mapped. As explained before, these error components have some actual error distribution. Ideally, the assumed error distribution on which the mapping function is based will be the actual error distribution, but this will not always be the case, although the aforementioned regularization terms incorporated into the mapping function may mitigate errors arising from mismatch between the assumed and actual error distributions. Further, the error characterization circuit 52 may be configured to estimate the actual error distribution or some other statistical property of the error components of the estimated symbols, so that the assumed error distribution used in the mapping step more reliably matches the actual error distribution.

With the error distribution selection, processing continues with selecting the mapping function to be used for mapping the symbol estimates to corresponding soft symbol values (Block 716). Different LUTs 56 may represent different mapping functions, each associated with a different assumed error distribution, so the selection process of Block 716 may comprise selecting the appropriate LUT 56. Further, Blocks 714 and 716 may be collapsed into one step, wherein the error distribution selection is implicitly performed in the sense that a particular mapping function is selected, where that mapping function corresponds to a particular assumed error distribution.

In any case, processing continues with mapping the estimated symbols into corresponding soft symbol values (Block 718). In the illustrated example, which is a special case applicable in the case of QAM and Gaussian noise, this step is based on mapping the real and imaginary parts of the estimated symbols to real and imaginary parts of the soft symbol estimates, respectively. This can be represented as $$\hat{s} = F^{(mod,SINR)}(Re[r]) + j \cdot F^{(mod,SINR)}(Im[r]),$$

where $\hat{s}$ denotes the soft symbol value and, as before, r denotes the estimated symbol, e.g., one of the first symbol estimates 44 corresponding to one of the first symbols 36. Also, as before, $F^{(mod,SINR)}$ denotes the mapping function, where the "mod" argument indicates that the mapping function used depends on the assumed error distribution of the error components of the estimated symbols, which in turn depends on the modulation scheme that is assumed or estimated for the received symbols being estimated. The "SINR" argument denotes that the mapping function also may depend on the symbol SNR or SINR for the symbols being estimated. For example, the regularization terms incorporated into the mapping function may themselves be a function of SNIR.

In an example embodiment, the error distribution is assumed to be Gaussian when the signal error is dominated by random noise (noise limited scenario) or when there are many noise sources. In an interference-limited case, in contrast, the error distribution can be assumed to be an interfering signal with an assumed modulation scheme, e.g., an interfering signal with a QAM distribution, possibly with a modulation order higher than that of the desired signal, plus Gaussian noise. Other error distributions for other scenarios may also be accounted for.

An example mapping function design is given for a 16QAM case, e.g., the first signal component 34 is a 16QAM signal, meaning that the first symbols 36 are distorted versions of the nominal constellation points in a 16QAM constellation. For the conventional gray-coded QAM, the real and imaginary components of the symbol may be treated separately, since the QAM symbol constellation is formed from symbols at each dimension (4PAM for 16QAM).

Denoting the received PAM symbol estimate by x=p+w, where p is the sent symbol and w is the per-dimension error component with variance $$\sigma_w^2 = \frac{1}{2} \frac{1}{SNR}.$$

Let the full set of PAM constellation points in a suitably scaled constellation be $p_n$, n=1 ... N (N=4 in this case). The soft PAM symbol estimate mapping function (from received symbol to reconstructed symbol) is then formed according to the definition of the expected value:

$$\hat{p} = \sum_{n=1}^{N} p_n Pr(x \mid p_n),$$

where Pr( ) is the probability function for the noise and interference. Below are a few examples of the mapping for different noise and interference assumptions.

For white Gaussian distribution, the baseline form of the mapping function is $$\hat{p} = \sum_{n=1}^{N} p_n Pr(x \mid p_n) = \frac{\sum_{n=1}^{N} p_n e^{-\frac{|x-p_n|^2}{2\sigma_w^2}}}{\sum_{n=1}^{N} e^{-\frac{|x-p_n|^2}{2\sigma_w^2}}}$$

Figure 8:
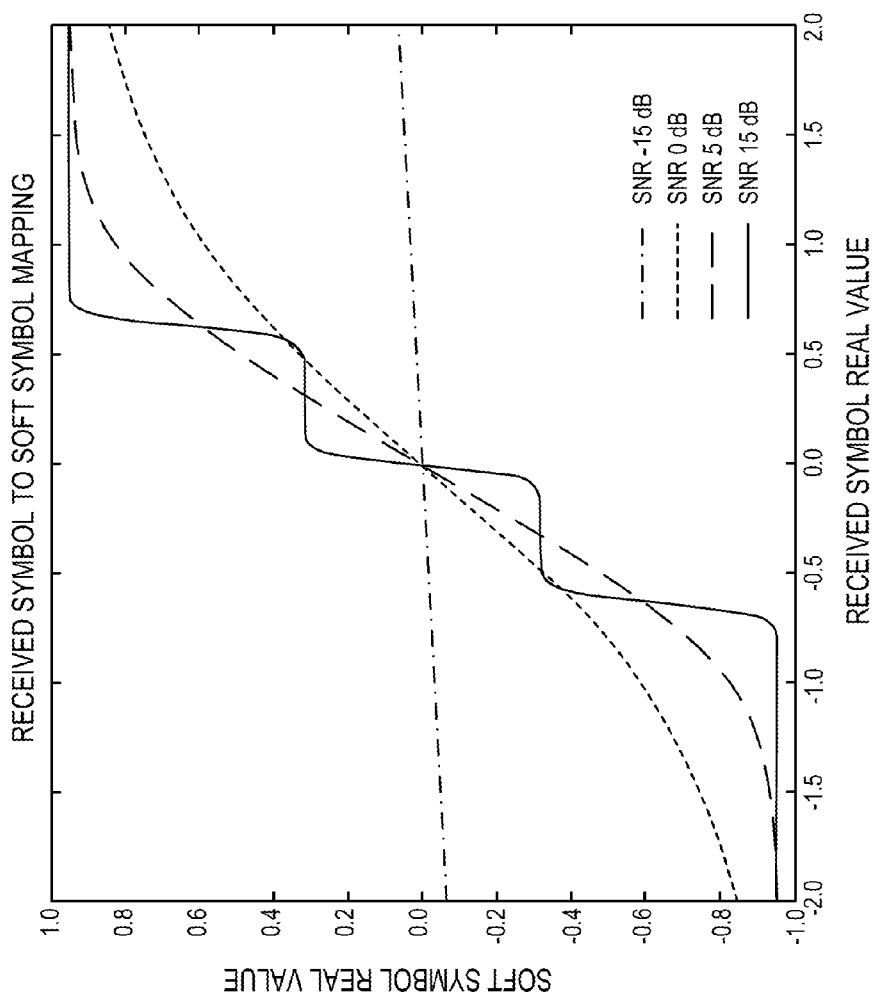
FIGS. 8 and 9 are diagrams of example mappings from symbol estimates to soft symbol values, for different symbol Signal-to-Noise Ratios (SNRs).

An example of this mapping function can be seen in FIG. 8, which illustrates optimal soft regeneration mappings for one dimension of 16 QAM (4 PAM) at different symbol-level SNRs when the noise giving rise to the error components of the first symbol estimates 44 is Gaussian and white. The x-axis of the figure shows the real part of the first symbol estimate, and the y-axis corresponds to the real value of the corresponding output soft symbol. The different curves correspond to different noise variances as seen by the first signal component. For example, at −15 dB SNR the output soft symbol estimate is very close to zero, whereas at +15 dB the output soft symbol estimate is often the closest constellation point.

As noted, however, in practical implementations, the signal scaling and noise variance estimates may be noisy, so that the mismatch between the actual and assumed error distributions leads to erroneous soft symbol estimates. The expression above can be made more robust to such outliers by adding appropriate regularization terms. The intention with the regularization terms is typically to artificially increase the perceived probability of received points that are further away from the ideal constellation point. This typically makes the resulting mapping function more "soft", i.e., it becomes less of a hard decision to the closest constellation point. The regularization embodiments below should be seen as mere examples; there are many possibilities to achieve this.

In one embodiment, the regularization may be invoked by limiting the minimum allowed symbol probability:

$$\hat{p} = \sum_{n=1}^{N} p_n Pr(x \mid p_n) = \frac{\sum_{n=1}^{N} p_n \left( e^{-\frac{|x-p_n|^2}{2\sigma_w^2}} + \varepsilon_1(\sigma_w^2) \right)}{\sum_{n=1}^{N} \left( e^{-\frac{|x-p_n|^2}{2\sigma_w^2}} + \varepsilon_1(\sigma_w^2) \right)},$$

where, in the example above, $\epsilon_1(\bullet)$ is a function that depends on the symbol SINR. While numerous possibilities exist for formulating $\epsilon_1(\bullet)$, in general its value grows as the symbol SINR decreases.

Alternatively, the $\epsilon_1(\bullet)$ function may depend additionally on the estimation quality of the signal scaling and noise variance parameters, e.g. their estimation variance or SNR. In general, for such formulations the value of $\epsilon_1(\bullet)$ grows as the estimation error increases. Or alternatively, the $\epsilon_1(\bullet)$ function may be a constant.

In another embodiment, the regularization term(s) may limit the minimum allowed noise variance:

$$\hat{p} = \sum_{n=1}^{N} p_n Pr(x \mid p_n) = \frac{\sum_{n=1}^{N} p_n e^{-\frac{|x-p_n|^2}{2\sigma_w^2 + \varepsilon_2(\sigma_w^2)}}}{\sum_{n=1}^{N} e^{-\frac{|x-p_n|^2}{2\sigma_w^2 + \varepsilon_2(\sigma_w^2)}}},$$

where $\epsilon_2(\bullet) \geq 0$ and may depend on the same parameters as $\epsilon_1(\bullet)$.

In yet another, related embodiment, the regularization term(s) may be operative to deliberately scale up the noise variance estimate, $$\hat{p} = \sum_{n=1}^{N} p_n Pr(x \mid p_n) = \frac{\sum_{n=1}^{N} p_n e^{-\frac{|x-p_n|^2}{2\sigma_w^2 \cdot \varepsilon_3(\sigma_w^2)}}}{\sum_{n=1}^{N} e^{-\frac{|x-p_n|^2}{2\sigma_w^2 \cdot \varepsilon_3(\sigma_w^2)}}},$$

where $\epsilon_3(\bullet) \geq 1$ may also depend on the same parameters as $\epsilon_1$.

In yet another, related embodiment, the regularization term(s) are operative to restrict the maximum distance between the estimated symbol value and the constellation points 80 within a defined modulation constellation 82 (e.g., between the real or imaginary part of a first symbol estimate 44 and a PAM constellation point):

$$\hat{p} = \sum_{n=1}^{N} p_n Pr(x \mid p_n) = \frac{\sum_{n=1}^{N} p_n e^{-\frac{\min(|x-p_n|^2, \beta(QAM, \sigma_w^2))}{2\sigma_w^2}}}{\sum_{n=1}^{N} e^{-\frac{\min(|x-p_n|^2, \beta(QAM, \sigma_w^2))}{2\sigma_w^2}}},$$

where $\beta(\bullet) > 0$ may also depend on the same parameters as $\epsilon_1$ and modulation order.

In yet another, related embodiment, the regularization term(s) may be operative to restrict the minimum probability for a constellation point 80:

$$\hat{p} = \sum_{n=1}^{N} p_n Pr(x \mid p_n) = \frac{\sum_{n=1}^{N} p_n \max\left( e^{-\frac{|x-p_n|^2}{2\sigma_w^2}}, \lambda(\sigma_w^2) \right)}{\sum_{n=1}^{N} \max\left( e^{-\frac{|x-p_n|^2}{2\sigma_w^2}}, \lambda(\sigma_w^2) \right)},$$

where $\gamma(\bullet) > 0$ may also depend on the same parameters as $\epsilon_1$.

Figure 9:
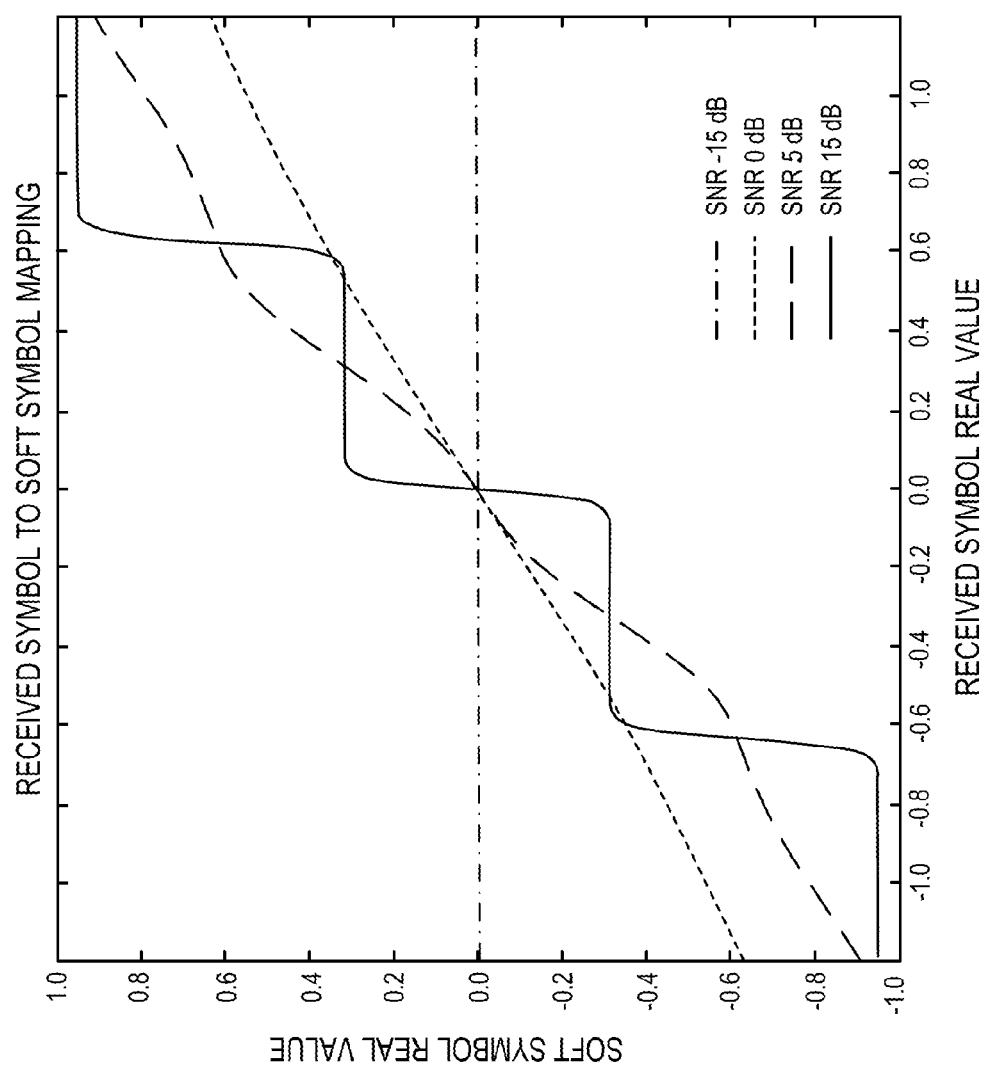

In an example where the first signal component 34 is a noise and interference signal which consists of a signal with known modulation plus white Gaussian noise, the baseline mapping function becomes:

$$\hat{p} = \sum_{n=1}^{N} p_n Pr(x \mid p_n) = \frac{\sum_{n=1}^{N} p_n \sum_{m=1}^{M} e^{-\frac{|x-p_n-q_m|^2}{2\sigma_w^2}}}{\sum_{n=1}^{N} \sum_{m=1}^{M} e^{-\frac{|x-p_n-q_m|^2}{2\sigma_w^2}}},$$

where $q^m$ are the complex modulation points of the interfering signal, potentially modified to take into account effects of propagation channels and other aspects of the receiver. For the interfering signal, one may assume that all constellation points have the same probability. An example of this mapping function can be seen in FIG. 9, which illustrates optimal soft regeneration mappings for one dimension of 16 QAM (4 PAM) at different symbol-level SNRs when the noise is a combination of white Gaussian noise and an interfering QPSK signal through a different channel. The dominant interferer proportion here is 80%, i.e. 80% of the noise-and-interference power in the communication signal 32 is from a QPSK interferer and 20% is from Gaussian noise. As can be seen by the sharper curve form, the shorter tails of the noise-and-interference distribution makes the mapping more aggressive, i.e. closer to a hard decision, at high SINR.

Noting that the mapping function is symmetric with respect to the origin for a number of useful example cases, one may implement the mapping function—e.g., a LUT 56—for positive input argument values. For example, the LUT 56 may include soft symbol values only for positive input values for the symbol estimates. In such an implementation, the mapping function becomes $$\hat{s} = sgn(Re[r]) \cdot F^{(parameters)}(|Re[r]|) + j \cdot sgn(Re[r]) \cdot F^{(parameters)}(|Im[r]|).$$

Further, at least in some embodiments, the mapping function is only used for a limited SINR range. Thus, a LUT 56 or other table-based implementation would need to include a relatively limited number of precomputed soft symbol values. In general, several measures may be used to decrease the table size: the number of tabulated values may depend on the SINR operating point, the mapping points may be non-uniformly spaced, and interpolation may be used for determining the final mapped value. The contents of the LUT(s) 56 may be computed offline and provisioned in memory, representing further simplification for the wireless apparatus 10.

Also, while PAM-based simplifications may be used for QAM symbols, the teachings herein apply directly to non-QAM symbols with the allowance that such symbols do not decompose into orthogonal PAM symbols. Thus, the mapping function $F^{(mod,SINR)}$ necessarily is two-dimensional. Regardless of such details, these teachings provide a low complexity and high performance soft symbol mapping implementation for a practical pre-decoding IC or JD receiver. The teachings also avoid the low-SNR performance degradation that arises in simplified soft value extraction schemes.

Broadly, the teachings herein present a method of generating soft symbol estimates or values from received symbol estimates, where the soft estimate is equal to a probability-weighted sum of all constellation points in the modulation constellation associated with transmitting the symbols being estimated. This sum represents the expected value of the received symbol, and also the optimal Mean Squared Error (MSE) cancellation value. The probability-weighted sums depend on assumed error distributions, and may include one or more regularization terms that constrain errors in probability value generation arising from, e.g., mismatch between the assumed and actual probability distributions. The estimations also may depend on the symbol SNR of the symbols being estimated, The soft symbol estimates are produced by a mapping function (e.g. table lookup). In one or more embodiments, the real and imaginary parts of the appropriately normalized received symbol are directly mapped to the real and imaginary parts of the soft symbol estimate, respectively. The mapping table may be selected based on the current, assumed modulation and symbol SNR for the first symbols 36. The mapping table(s) used to implement the mapping function(s) are preferably computed using the theoretically exact expected symbol value expression, via probability-weighted summing of all individual constellation points.

In interference cancellation, estimates of the transmitted interfering symbols need to be formed. In a pre-decoding interference cancellation (demodulate-and-cancel) architecture, the mapping from received symbol estimates to soft (expected) symbol values is a critical operation, both in terms of performance and complexity. The teachings herein provide a simple soft symbol mapping solution for pre-decoding IC operation and/or other signal processing operations.

Figure 10:
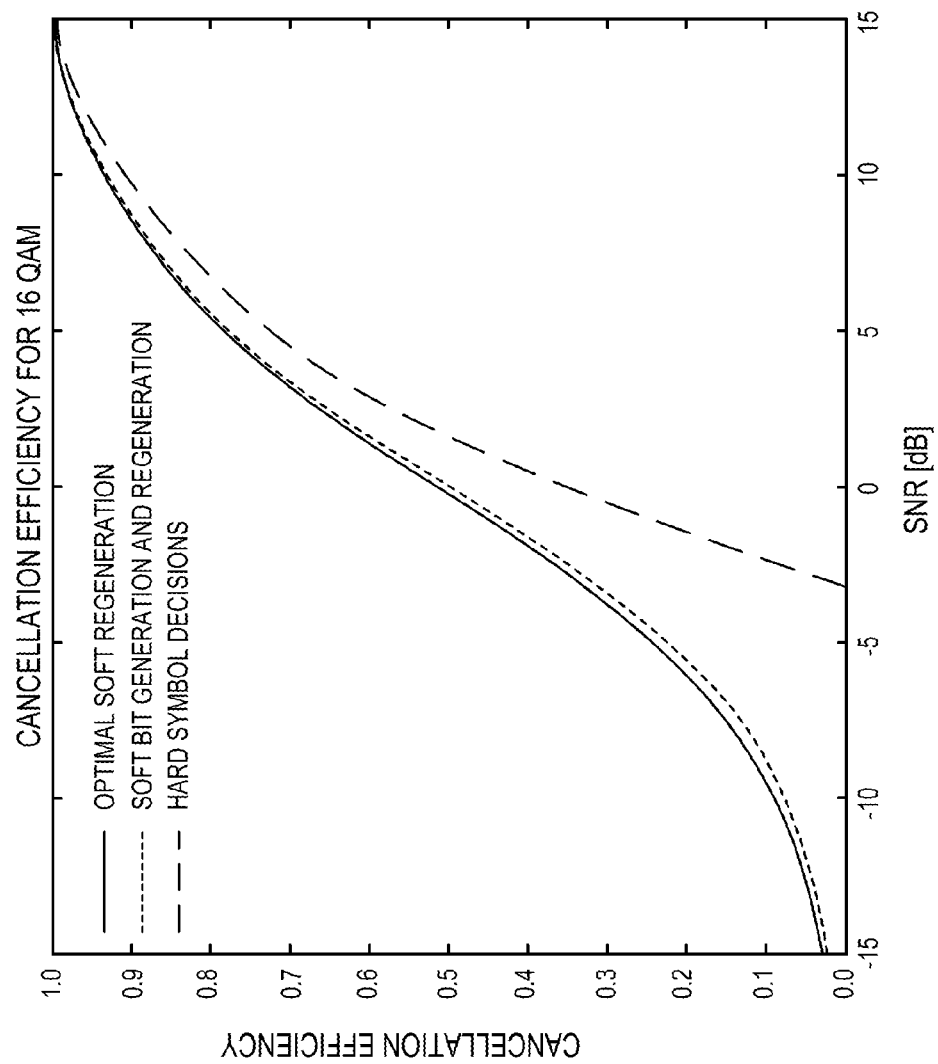
FIG. 10 is a diagram of an example of interference cancellation efficiency obtained using soft symbol values obtained by mapping symbol estimates to soft symbol values as taught herein, wherein the symbol estimates correspond to interfering symbols received at a wireless apparatus.

When the assumed probability density distribution of the error components of the estimated symbols being mapped to soft symbol values is correct, the contemplated mapping is optimal. For example, FIG. 10 illustrates cancelation efficiency (fraction of removed symbol energy) for different methods of soft value regeneration in pre-decoding IC under Gaussian assumption. For example, the illustration can be understood as demonstrating cancellation efficiency as regards mitigating interference in the second symbols 40 of the communication signal 32, as arising from the first symbols 36. "Optimal soft regeneration" is the diagram label assigned to the method taught herein and it should be noted that it compares favorably with optimal regeneration using soft bit values rather than soft symbol values, and does so without the potential complexity attending the use of soft bits. "Soft bit generation and regeneration" is the diagram label corresponding to the legacy, soft-bit based methods disclosed in U.S. Pat. Nos. 7,315,578 and 8,340,202 (neither of which individually solves the problem). As a further advantage, the mapping process taught herein also may incorporate one or more regularization terms to limit errors arising from mismatch between the assumed error distribution and the actual error distribution. "Hard symbol decisions" is the diagram label corresponding to the legacy method of assigning the closest constellation point as the soft symbol value; this approach is clearly suboptimal, especially at lower SNRs.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of symbol estimation in a wireless apparatus comprising:
   receiving a communication signal comprising first and second signal components;
   generating first symbol estimates corresponding to first symbols conveyed in the first signal component, each first symbol estimate representing a symbol component and an error component;
   obtaining soft symbol values from the first symbol estimates via a mapping function that maps each first symbol estimate to a corresponding soft symbol value that represents a probability-weighted summation of all constellation points in a defined modulation constellation assumed for the first symbols, wherein the probability weighting of each constellation point in the summation is a function of the first symbol estimate relative to the constellation point and an assumed error distribution for the error components of the first symbol estimates; and
   estimating second symbols as a function of the soft symbol values, where the second symbols are conveyed in the second signal component of the communication signal.

2. The method of claim 1, wherein estimating the second symbols as a function of the soft symbol values comprises using the soft symbol values to mitigate interference in the second symbols arising from the first symbols.

3. The method of claim 2, wherein using the soft symbol values to mitigate interference in the second symbols comprises estimating, as a function of the soft symbol values, contributions of the first symbols to the communication signal, and subtracting the estimated contributions from corresponding samples of the communication signal before or in conjunction with demodulating or decoding the communication signal with respect to the second symbols.

4. The method of claim 1, wherein estimating the second symbols as a function of the soft symbol values comprises using the soft symbol values to generate joint detection metrics for detecting the second symbols.

5. The method of claim 1, wherein the probability weighting for each constellation point is a probability value indicating the probability that the constellation point represents the transmitted value of the corresponding first symbol, and wherein the mapping function incorporates one or more regularization terms that are computed as a function of a Signal to Noise Ratio (SNR) estimated for the first symbol estimates and are operative to reduce probability weighting errors arising from differences between the assumed error distribution and the actual error distribution of the error components of the first symbols.

6. The method of claim 5, wherein the one or more regularization terms comprise one or more terms that are operative within the mapping function to:
   limit the minimum and/or maximum probability value used for probability weighting;
   limit the minimum assumed variance of the error components of the first symbol estimates;
   limit a maximum allowable distance between the first symbol estimate and the constellation points in the defined modulation constellation; and
   scale up an error variance estimate associated with the error components of the first symbol estimates.

7. The method of claim 1, wherein the mapping function is implemented via a Look-up Table (LUT) that is indexed into as a function of the first symbol estimates and that maps the first symbol estimates to corresponding pre-computed soft symbol values.

8. The method of claim 7, wherein the LUT comprises one among two or more LUTs, each LUT corresponding to a different assumed error distribution for the error components of the first symbol estimates, and wherein the method further comprises selecting which LUT to use, based on which assumed error distribution is used.

9. The method of claim 1, further comprising changing the mapping function used to obtain the soft symbol values, based on at least one of: the modulation scheme estimated or assumed for the first symbols, and a symbol Signal-to-Noise Ratio (SNR) estimated for the first symbols.

10. The method of claim 1, further comprising applying the mapping function separately to the real and imaginary components of each first symbol estimate.

11. The method of claim 10, wherein the defined modulation constellation is represented as one or more Pulse Amplitude Modulation (PAM) constellations having nominal magnitude values for the real and imaginary parts of the first symbols, so that obtaining soft symbol values from the first symbol estimates comprises, for each first symbol estimate, obtaining PAM symbol estimates corresponding to the real and imaginary parts of each first symbol estimate.

12. The method of claim 1, wherein the mapping function assumes the error components of the first symbol estimates to be one or more interfering signals with known modulations plus additive Gaussian noise.

13. The method of claim 12, wherein the mapping function is selected based on estimating the error distribution parameters of the first signal component.

14. The method of claim 1, wherein the assumed error distribution is a Gaussian distribution.

15. The method of claim 1, wherein the assumed error distribution is a non-Gaussian distribution.

16. A wireless apparatus comprising:
   receiver circuitry configured to output a communication signal corresponding to an antenna-received communication signal and comprising first and second signal components;
   a processing circuit operatively associated with the receiver circuitry and configured to:
      generate first symbol estimates corresponding to first symbols conveyed in the first signal component, each first symbol estimate representing a symbol component and an error component;
      obtain soft symbol values from the first symbol estimates via a mapping function that maps each first symbol estimate to a corresponding soft symbol value that represents a probability-weighted summation of all constellation points in a defined modulation constellation assumed for the first symbols, wherein the probability weighting of each constellation point in the summation is a function of the first symbol estimate relative to the constellation point and an assumed error distribution for the error components of the first symbol estimates; and
      estimate second symbols as a function of the soft symbol values, where the second symbols are conveyed in the second signal component of the communication signal.

17. The wireless apparatus of claim 16, wherein the processing circuit is configured to estimate the second symbols as a function of the soft symbol values by using the soft symbol values to mitigate interference in the second symbols arising from the first symbols.

18. The wireless apparatus of claim 17, wherein the processing circuit is configured to use the soft symbol values to mitigate interference in the second symbols by estimating, as a function of the soft symbol values, contributions of the first symbols to the communication signal, and subtracting the estimated contributions from corresponding samples of the communication signal before or in conjunction with demodulating or decoding the communication signal with respect to the second symbols.

19. The wireless apparatus of claim 16, wherein the processing circuit is configured to estimate the second symbols as a function of the soft symbol values by using the soft symbol values to generate joint detection metrics for detecting the second symbols.

20. The wireless apparatus of claim 16, wherein the probability weighting for each constellation point is a probability value indicating the probability that the constellation point represents the transmitted value of the corresponding first symbol, and wherein the mapping function incorporates one or more regularization terms that are computed as a function of a Signal to Noise Ratio (SNR) estimated for the first symbol estimates and are operative to reduce probability weighting errors arising from differences between the assumed error distribution and the actual error distribution of the error components of the first symbols.

21. The wireless apparatus of claim 20, wherein the one or more regularization terms comprise one or more terms that are operative within the mapping function to:
   limit the minimum and/or maximum probability value used for probability weighting;
   limit the minimum assumed variance of the error components of the first symbol estimates;
   limit a maximum allowable distance between the first symbol estimate and the constellation points in the defined modulation constellation; and
   scale up an error variance estimate associated with the error components of the first symbol estimates.

22. The wireless apparatus of claim 16, wherein the processing circuit includes or is associated with a memory storing a Look-up Table (LUT), and wherein the processing circuit is configured to index into the LUT as a function of the first symbol estimates and the LUT implements the mapping function by mapping from the first symbol estimates to corresponding pre-computed soft symbol values.

23. The wireless apparatus of claim 16, wherein the mapping function assumes the error components of the first symbol estimates to be one or more interfering signals with known modulations plus additive Gaussian noise.

24. The wireless apparatus of claim 16, wherein the processing circuit comprises a digital processing circuit that is configured as:
   an error characterization circuit configured to estimate the error distribution of the error components of the first symbol estimates as the assumed error distribution; and
   a mapping circuit configured to implement the mapping function, for obtaining the soft symbol values.

25. The wireless apparatus of claim 16, wherein one of the processing circuit or the receiver circuitry comprises a symbol estimation circuit configured to output the first symbol estimates, based on performing an equalization process on digital samples of the communication signal.

26. The wireless apparatus of claim 16, wherein one of the processing circuit and the receiver circuitry includes an interference-mitigation circuit that estimates contributions of the first symbols to the communication signal, based on the soft symbol values, and suppresses the estimated contributions from the communication signal for detecting or decoding the second symbols.

27. The wireless apparatus of claim 16, wherein the processing circuit is configured to change the mapping function used to obtain the soft symbol values, based on at least one of: the modulation scheme estimated or assumed for the first symbols, and a symbol Signal-to-Noise Ratio (SNR) estimated for the first symbols.

* * * * *